United States Patent
Orikasa

(10) Patent No.: US 7,298,113 B2
(45) Date of Patent: Nov. 20, 2007

(54) BATTERY PACK

(75) Inventor: Hironobu Orikasa, Fukushima (JP)

(73) Assignee: Sony Corporation, Tokyo (JP)

( * ) Notice: Subject to any disclaimer, the term of this patent is extended or adjusted under 35 U.S.C. 154(b) by 425 days.

(21) Appl. No.: 10/967,559

(22) Filed: Oct. 18, 2004

(65) Prior Publication Data

US 2005/0127871 A1    Jun. 16, 2005

(30) Foreign Application Priority Data

Oct. 27, 2003    (JP)  ............................ 2003-365853

(51) Int. Cl.
*H02J 7/02* (2006.01)
*H02J 7/00* (2006.01)
*H02J 7/04* (2006.01)

(52) U.S. Cl. ....................... 320/112; 320/110; 320/113; 320/103; 320/138; 320/140

(58) Field of Classification Search ................ 320/110, 320/112, 113, 103, 138, 140
See application file for complete search history.

(56) References Cited

U.S. PATENT DOCUMENTS

| | | | |
|---|---|---|---|
| 6,208,117 B1 * | 3/2001 | Hibi | ........................... 320/134 |
| 6,392,383 B1 * | 5/2002 | Takimoto et al. | ........... 320/115 |
| 6,452,362 B1 * | 9/2002 | Choo | .......................... 320/116 |
| 6,479,963 B1 * | 11/2002 | Manor et al. | ................ 320/110 |
| 6,603,285 B2 * | 8/2003 | Aoyagi et al. | .............. 320/134 |
| 2004/0101747 A1 * | 5/2004 | Bushong et al. | ............. 429/163 |

OTHER PUBLICATIONS

Maxim Integrated Products, DATASHEET for MAX1701, Jan. 1999, Maxim Integrated Products, Rev1.*

* cited by examiner

*Primary Examiner*—Bao Q. Vu
*Assistant Examiner*—Jue Zhang
(74) *Attorney, Agent, or Firm*—Sonnenschein Nath & Rosenthal LLP

(57) ABSTRACT

A detecting switch which is turned on/off in accordance with whether or not primary batteries have been attached to a primary battery holder is provided. In a normal state where no primary battery is attached, terminals (a, c) of a charge change-over switch are connected by a detection signal of the detecting switch, so that a voltage supplied from an external charger is inputted to a DC/DC converter. A secondary battery is charged by a predetermined value output of the DC/DC converter. When the primary batteries are attached, the detecting switch is turned on and terminals (b, c) of the charge change-over switch are connected, so that an output voltage of the primary batteries is inputted to the DC/DC converter. The secondary battery is charged by the predetermined value output of the DC/DC converter. Even when there is no charger, the secondary battery can be charged by the primary batteries and charging power sources are automatically switched.

6 Claims, 10 Drawing Sheets

BATTERY PACK

RELATED APPLICATION DATA

The present application claims priority to Japanese Application(s) No(s). P2003-365853 filed Oct. 27, 2003, which application(s) is/are incorporated herein by reference to the extent permitted by law.

BACKGROUND OF THE INVENTION

1. Field of the Invention

The invention relates to a battery pack which has both a primary battery and a secondary battery such as a lithium ion battery or the like and which enables the secondary battery to be charged by the primary battery.

2. Description of the Related Arts

Secondary batteries are widely used in portable electronic apparatuses. Since a lithium ion battery is weak against an overcharge or an overdischarge, in general, it has a construction of a battery pack in which a battery cell and a protecting circuit are integrated. The protecting circuit has three functions of protection against the overcharge, the overdischarge, and an overcurrent. Those protecting functions will be simply explained hereinbelow.

The overcharge protecting function will now be described. When the lithium ion battery is charged, a battery voltage continues to rise even after exceeding a full charge state. When the battery enters such an overcharge state, a possibility that the battery enters a dangerous state occurs. Therefore, it is necessary to charge the battery at a constant current and a constant voltage and by a charge control voltage that is equal to or less than a rated value (for example, 4.2 V) of the battery. However, there is a risk of occurrence of the overcharge due to a failure of a charger or use of a charger for a different kind of battery. When the battery is overcharged and the battery voltage is equal to a certain value or more, the protecting circuit turns off a charge control FET, thereby shutting off a charge current. Such a function is the overcharge protecting function.

The overdischarge protecting function will now be described. When the battery is discharged to a rated discharge terminating voltage or less and enters the overdischarge state where the battery voltage is equal to, for example, 2 to 1.5 V or less, there is a case where the battery fails. When the battery is discharged and the battery voltage is equal to a certain voltage value or less, the protecting circuit turns off a discharge control FET, thereby shutting off a discharge current. Such a function is the overdischarge protecting function.

The overcurrent protecting function will now be described. When (+) and (−) terminals of the battery are short-circuited, a large current flows, so that there is a risk of abnormal heat generation. When a discharge current of a certain value or more flows, the protecting circuit turns off the discharge control FET, thereby shutting off the discharge current. Such a function is the overcurrent protecting function.

A conventional secondary battery pack is constructed only by a secondary battery and it is necessary to charge it by using a dedicated charger from a power source for household use at home or the like. Therefore, when a residual capacity of the battery is extinguished at a place where the user has gone to, there is such inconvenience that portable electronic apparatuses such as cellular phone, PDA (Personal Digital Assistants), digital camera, camcoder (a general abbreviated name of "camera and recorder", video camera+recorder), and the like cannot be used.

As one of methods of solving such a problem, in cellular phones, a charging apparatus comprising only a primary battery which can be connected to a main body has been put into practical use. However, there is such a problem that the user has to separately carry a charging pack. To solve such a problem, a battery pack in which both a primary battery and a secondary battery are integrated is used and when a voltage of the secondary battery drops, the secondary battery is charged by the primary battery has been disclosed in JP-A-2000-324703.

According to the battery pack disclosed in JP-A-2000-324703, a comparator for comparing a voltage of the primary battery with that of the secondary battery is provided and when the voltage of the primary battery is larger than that of the secondary battery, the secondary battery is charged by the voltage of the primary battery through a regulator.

According to the battery pack disclosed in JP-A-2000-324703, although there is a disclosure that the battery is charged by an external charger, the battery pack does not have a function for automatically switching the primary battery as a charging power source and the external charger and a voltage from the external charger is not controlled. Further, when the battery is charged by the primary battery, the voltage of the primary battery is controlled by the regulator. If the voltage is controlled by the regulator, efficiency is low and a large electric power is wastefully consumed. Further, since the regulator is not small, a circuit cannot be miniaturized by the method of controlling by the regulator,

OBJECTS AND SUMMARY OF THE INVENTION

It is, therefore, an object of the invention to provide a battery pack in which a charge from an external charger and a charge by a primary battery are automatically switched.

Another object of the invention is to provide a battery pack in which if a DC/DC converter is used instead of a regulator when a voltage of a primary battery is controlled, efficiency can be improved and miniaturization of a size and reduction of costs can be further realized.

To accomplish the above objects, according to one aspect of the invention, there is provided a battery pack having a secondary battery, comprising: a holding unit for detachably holding a primary battery; a switch for switching a voltage of the primary battery and a voltage at an external terminal; a voltage converter to which either the primary battery voltage or the external terminal voltage selected by the switch is inputted and which supplies a stabilized output voltage to a positive polarity of the secondary battery; and control means for controlling the switch so as to select the external terminal voltage in a normal state and, when the primary battery is attached, select the primary battery voltage.

According to another aspect of the invention, there is provided a battery pack having a secondary battery, comprising: a holding unit for detachably holding a primary battery; a switch for switching a voltage of the primary battery and a voltage at an external terminal; a voltage converter to which either the primary battery voltage or the external terminal voltage selected by the switch is inputted and which supplies a stabilized output voltage to a positive polarity of the secondary battery; and control means for controlling the switch so as to select the primary battery voltage in a normal state and, when the external terminal voltage is supplied, select the external terminal voltage.

According to the invention, even at a place where there is no power source for household use in the case where the user has gone or the like, if he has the primary battery, he can charge the secondary battery merely by attaching the primary battery.

According to the invention, by controlling the switch by the control means, the charge by the external terminal voltage from an external charger and the charge by the primary battery voltage can be automatically switched.

According to the invention, by using a DC/DC converter as a charging voltage converter for controlling the voltage of the primary battery, the efficiency can be improved and the miniaturization and the reduction in costs can be realized as compared with the case of using the regulator.

According to the invention, by providing the switch for switching the charging power sources, the state where a current flows reversely from the charger side to the primary battery when the primary battery is attached can be prevented and the state where the current from the charger and the current from the primary battery side flow simultaneously can be prevented.

The above and other objects and features of the present invention will become apparent from the following detailed description and the appended claims with reference to the accompanying drawings.

DETAILED DESCRIPTION OF THE PREFERRED EMBODIMENTS

Figure 1:
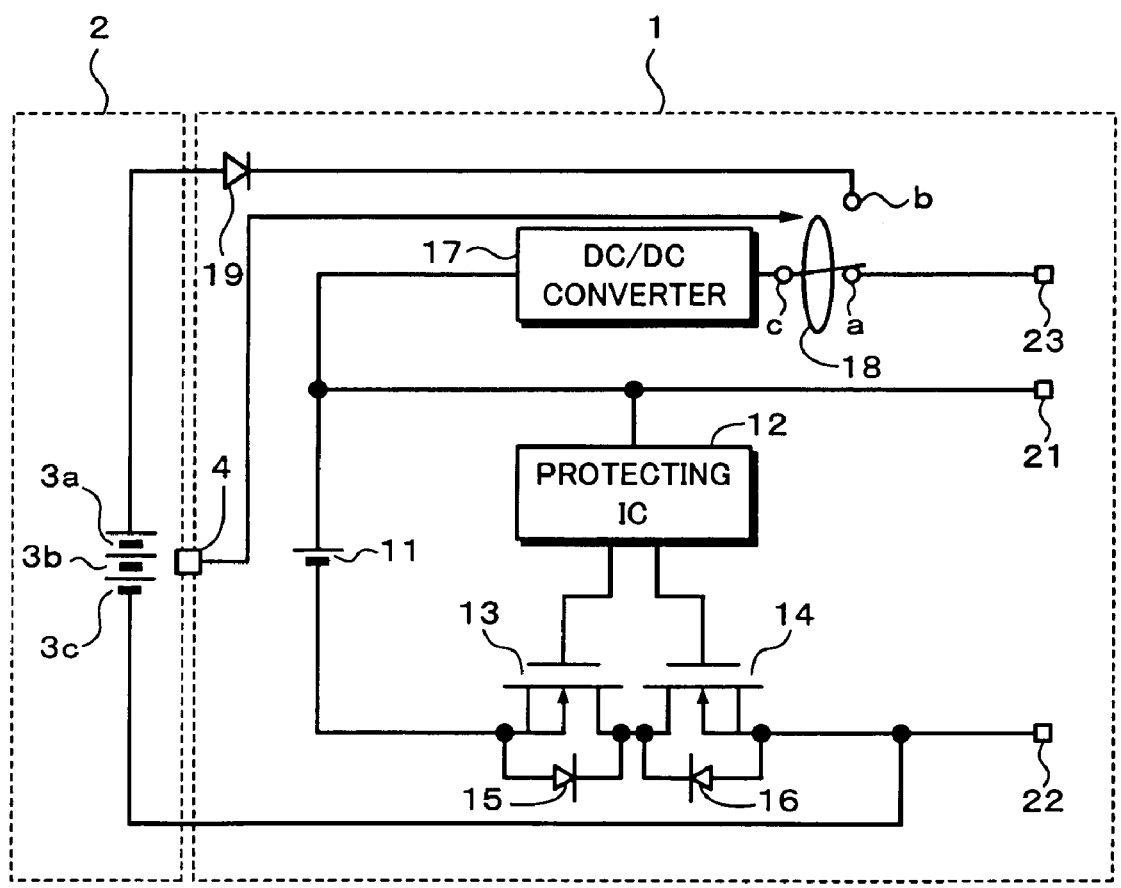
FIG. 1 is a connection diagram of the first embodiment of the invention.

The first embodiment of the invention will be described hereinbelow with reference to FIG. 1. In FIG. 1, reference numeral 1 denotes a battery pack of a secondary battery and 2 indicates a primary battery holder. A detecting switch 4 which is turned on/off in accordance with whether or not primary batteries, for example, three primary batteries 3a, 3b, and 3c have been attached to the primary battery holder 2 is provided. Each of the primary batteries 3a to 3c is an AA size (R6) battery.

A construction using the three primary batteries is shown as an example and one or more primary batteries can be used. As each of the primary batteries 3a to 3c, a manganese battery, an alkaline battery, a lithium battery, an air battery, or the like can be used. In each of FIG. 1 and other connection diagrams, only a connecting construction in the state where the primary batteries 3a to 3c are attached is shown for simplicity of explanation.

Figure 2A:
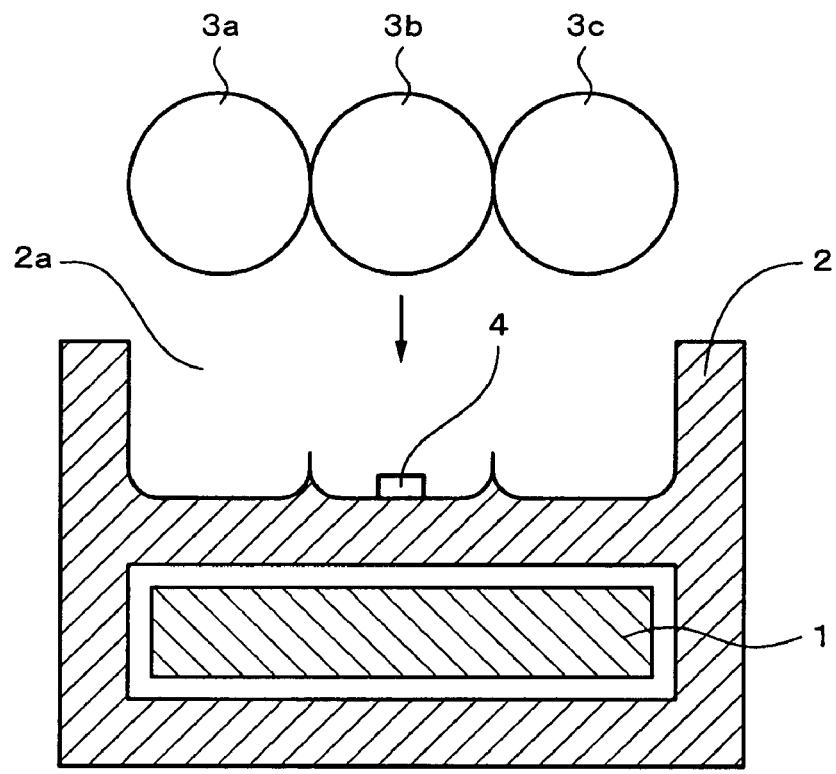
FIGS. 2A and 2B are schematic diagrams showing a construction of the first example of a battery pack to which the invention is applied.
Figure 2B:
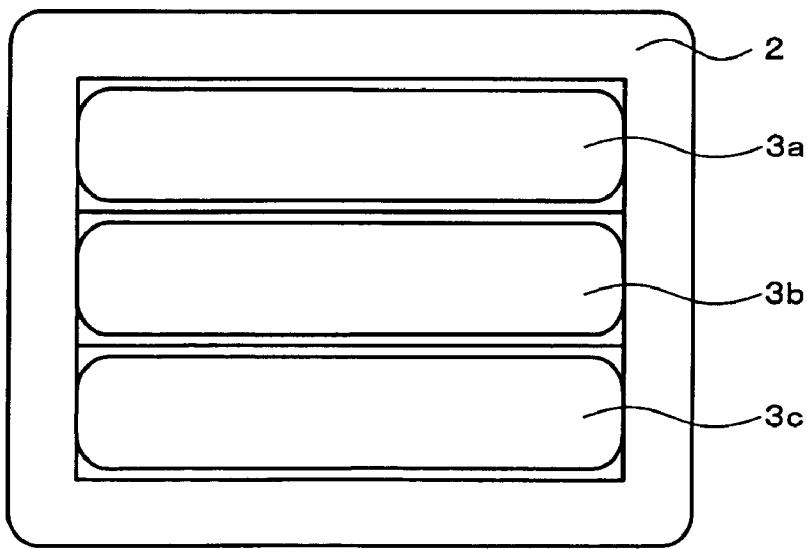

FIGS. 2A, 2B, 3A, and 3B show constructions of one and another example of the secondary battery pack 1 and the primary battery holder 2, respectively. In the example of FIGS. 2A and 2B, the battery pack 1 is enclosed in an enclosing portion of the side lower than a bottom surface of the primary battery holder 2 and the primary batteries 3a to 3c are attached onto the bottom surface of the primary battery holder 2.

The detecting switch 4 is arranged onto the bottom surface of the primary battery holder 2. The detecting switch 4 is turned on in the state where the primary battery 3b has been attached and is turned off in the state where the primary battery 3b is not attached.

Figure 3A:
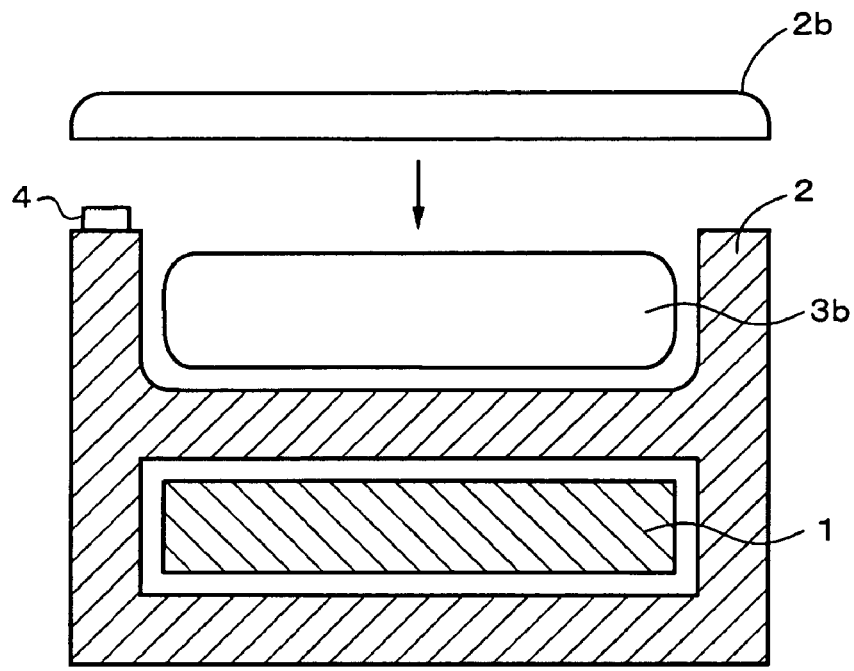
FIGS. 3A and 3B are schematic diagrams showing a construction of the second example of the battery pack to which the invention is applied.
Figure 3B:
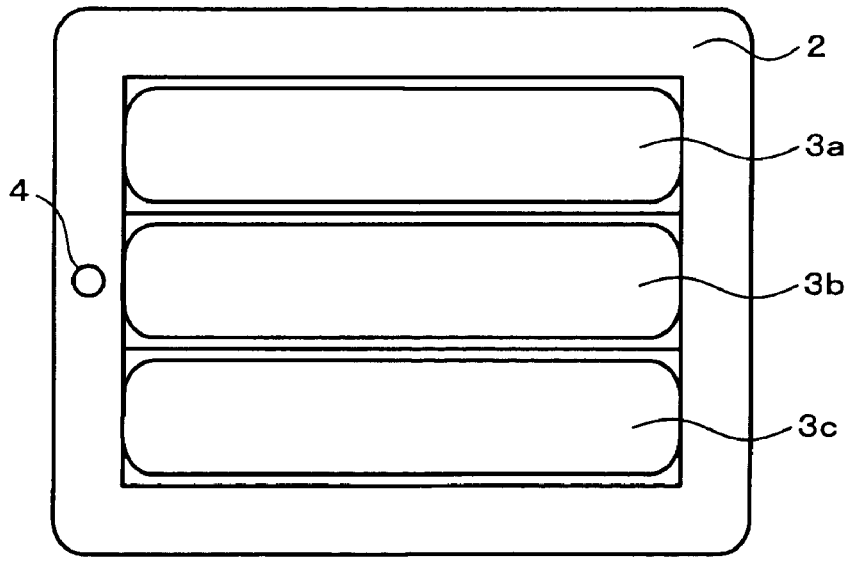

In another example shown in FIGS. 3A and 3B, the primary battery holder 2 has a concave portion for enclosing the primary batteries 3a to 3c and an upper portion of the holder 2 is covered with a lid 2b. The lid 2b is fixed to the primary battery holder 2 by nails (not shown) for engagement. The secondary battery pack 1 is enclosed in the enclosing portion of the side lower than the bottom surface of the primary battery holder 2.

The detecting switch 4 is provided on an edge surface of a periphery of an opening portion of the primary battery holder 2 where it is come into contact with the lid 2b. When the lid 2b is put onto the holder 2, the detecting switch 4 is turned on. When the lid 2b is removed, the detecting switch 4 is turned off.

The first embodiment of the invention will now be described with reference to FIG. 1 again. The secondary battery pack 1 has: a secondary battery 11; a protecting circuit (IC) 12; FETs 13 and 14; parasitic diodes 15 and 16; a DC/DC converter 17; and a charge change-over switch 18.

Any of a lithium ion battery, a lithium polymer battery, a nickel hydrogen battery, a nickel-cadmium (Ni—Cd) battery, a lithium metal battery, and the like can be used as a secondary battery 11. In the case of the lithium ion battery, for example, it is constructed as a rectangular battery and the whole secondary battery 11 is covered by a battery can of iron. In the case of the lithium polymer battery, it is sealed by a laminated film of aluminum. The secondary battery can be also replaced with a secondary battery of a kind which will be developed in the future.

The DC/DC converter 17 is a circuit for converting an input voltage from the charge change-over switch 18 into a stabilized DC voltage. Any of various kinds of converters can be used as a DC/DC converter 17. That is, one of the following constructions can be used: a charger pump system using a capacitor and a switching element; a step-up converter (step-down converter) using a diode, an inductor, a capacitor, and a switching element; a switching regulator using a transformer and a switching element; and a piezoelectric inverter using a piezoelectric transformer. Efficiency of those DC/DC converters are better than that of a series regulator using a bipolar transistor device. Since a very small device of about 4 mm square has already been developed as a voltage converter of the charger pump system or a switching regulator, the DC/DC converter 17 can be relatively easily built in the secondary battery pack 1 together with the protecting circuit 12.

A positive polarity of the secondary battery 11 is connected to an external terminal 21, and a negative polarity is connected to an external terminal 22 through the FET 13 as a switch for a discharge current and the FET 14 as a switch for a charge current. A voltage of the secondary battery 11 which is outputted across the external terminals 21 and 22 is set to, for example, about 2.5 to 4.3 V.

The FETs 13 and 14 are, for example, FETs of the n-channel type. The parasitic diodes 15 and 16 are connected in parallel with the FETs 13 and 14. The FETs 13 and 14 are controlled by a discharge control signal and a charge control signal from the protecting circuit 12, respectively.

The protecting circuit 12 has a general circuit construction. The FETs 13 and 14 are controlled by the protecting circuit 12 and the overcharge protection, the overdischarge protection, and the overcurrent protection are performed. If the battery is in a normal state where the battery voltage is within a set voltage range, both of the discharge control signal and the charge control signal are set to "1" (this means a logical level) and the FETs 13 and 14 are turned on. Therefore, the discharge from the secondary battery 11 to a load and the charge from the charger to the secondary battery 11 can be freely executed.

When the battery voltage is lower than the set voltage range, the discharge control signal is set to "0" (this means a logical level) and the FET 13 is turned off, thereby inhibiting the discharge current from flowing. After that, when the charger is connected, the battery is charged through the diode 15.

When the battery voltage is higher than the set voltage range, the charge control signal is set to "0" and the FET 14 is turned off, thereby inhibiting the charge. The discharge to the load is performed through the diode 16.

Further, the external terminals 21 and 22 are short-circuited, the overdischarge current flows and there is a possibility that the FET is broken. Therefore, when the discharge current reaches a predetermined current value, the discharge control signal is set to "0" and the FET 13 is turned off, thereby inhibiting the discharge current from flowing.

Reference numeral 23 denotes a charging terminal to which an external terminal voltage is supplied from an external charger, that is, an AC adapter (not shown). The AC adapter converts a household AC power source (100V) into, for example, 5V. If the charger is not connected, the charging terminal 23 is opened. However, a pull-down resistor (not shown) is connected to the charging terminal 23 so that the charging terminal 23 is set to 0V when the charger is not connected. The charging terminal 23 is connected to one input terminal (a) of the charge change-over switch 18. An output terminal (c) of the charge change-over switch 18 is connected to an input terminal of the DC/DC converter 17.

Further, the other input terminal (b) of the charge change-over switch 18 is connected to a cathode of a diode 19. An anode of the diode 19 is connected to positive polarities of the primary batteries 3a to 3c. Negative polarities of the primary batteries 3a to 3c are connected to the external terminal 22. The diode 19 prevents the current from reversely flowing from the secondary battery side to the primary battery side. Since the charge change-over switch 18 is provided, it is possible to prevent the primary batteries 3a to 3c from being charged by the external terminal voltage.

The charge change-over switch 18 is controlled by a detection signal from the detecting switch 4 as control means. The detecting switch 4 is turned on or off in accordance with whether or not the primary batteries 3a to 3c have been attached to the battery holder as mentioned above. Although an amplifier, a pulse generator, and the like are actually connected to the detecting switch 4, they are omitted in the diagram.

In the normal state where the primary batteries 3a to 3c are not attached to the battery holder, the detecting switch 4 is turned off, the detection signal is set to, for example, "0" (this means "0" as a logic value), and the input terminal (a) and the output terminal (c) of the charge change-over switch 18 are connected. The voltage which is supplied from the external charger to the charging terminal 23 is inputted to the DC/DC converter 17. The secondary battery 11 is charged by an output of a predetermined value of the DC/DC converter 17.

When the primary batteries 3a to 3c are attached to the battery holder, the detecting switch 4 is turned on, the detection signal is set to, for example, "1" (this means "1" as a logic value), and the input terminal (b) and the output terminal (c) of the charge change-over switch 18 are connected through the diode 19. The voltage which is supplied from the primary batteries 3a to 3c is inputted to the DC/DC converter 17. The secondary battery 11 is charged by an output voltage of a predetermined value of the DC/DC converter 17, for example, a charging voltage of 4.2V.

As mentioned above, both the voltage from the primary battery side and the voltage from the charger side are controlled by the DC/DC converter 17. The DC/DC converter 17 has a step-up/down type construction in which when the charging voltage is lower than the set voltage value, the voltage is stepped up, and when the charging voltage is higher than the set voltage value, the voltage is stepped down. The secondary battery is charged by the voltage which was controlled to the rated charging voltage value. When the battery is charged, it is prevented by the DC/DC converter 17 from being charged by a voltage higher than the rated charging voltage value of the secondary battery 11, for example, the lithium ion secondary battery.

Although the embodiment has been described above on the assumption that the charge change-over switch 18 is an electronic switch which is controlled by the detection signal, the charge change-over switch 18 can be realized by a mechanical switch. That is, the charge change-over switch 18 can be also constructed in such a manner that the input terminal (a) (on the side of the external charger) and the output terminal (c) are connected in the normal state and when the primary batteries 3a to 3c are attached, the switch 18 is mechanically switched to the state where the input terminal (b) (on the side of the primary battery) and the output terminal (c) are connected.

Figure 4:
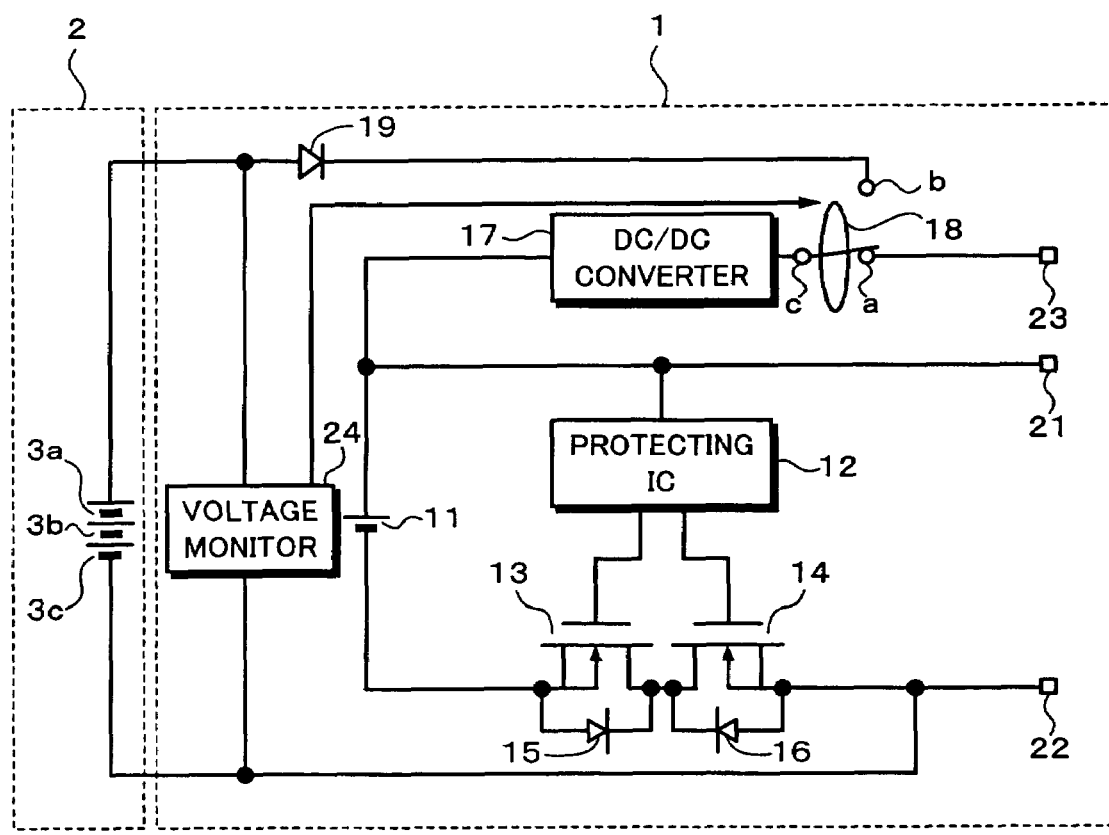
FIG. 4 is a connection diagram of the second embodiment of the invention.

FIG. 4 shows a circuit construction of the second embodiment of the invention. Portions corresponding to those in the construction of FIG. 1 are designated by the same reference numerals. A voltage monitor 24 is provided as control means, the voltage values of the primary batteries 3a to 3c are detected by the voltage monitor 24, and the charge change-over switch 18 is controlled in accordance with a detection result.

In the normal state, an output detection signal of the voltage monitor 24 is equal to "0" and the charge change-over switch 18 selects the input terminal (a) to which the output of the external charger is supplied. When the primary batteries 3a to 3c are attached and the voltage values of the primary batteries 3a to 3c detected by the voltage monitor 24 are equal to the set voltage value or more, the output detection signal of the voltage monitor 24 is set to "1". The charge change-over switch 18 is automatically switched from the charger side (input terminal (a)) to the primary battery side (input terminal (b)) by this detection signal and the charge from the primary batteries 3a to 3c is started.

Figure 5:
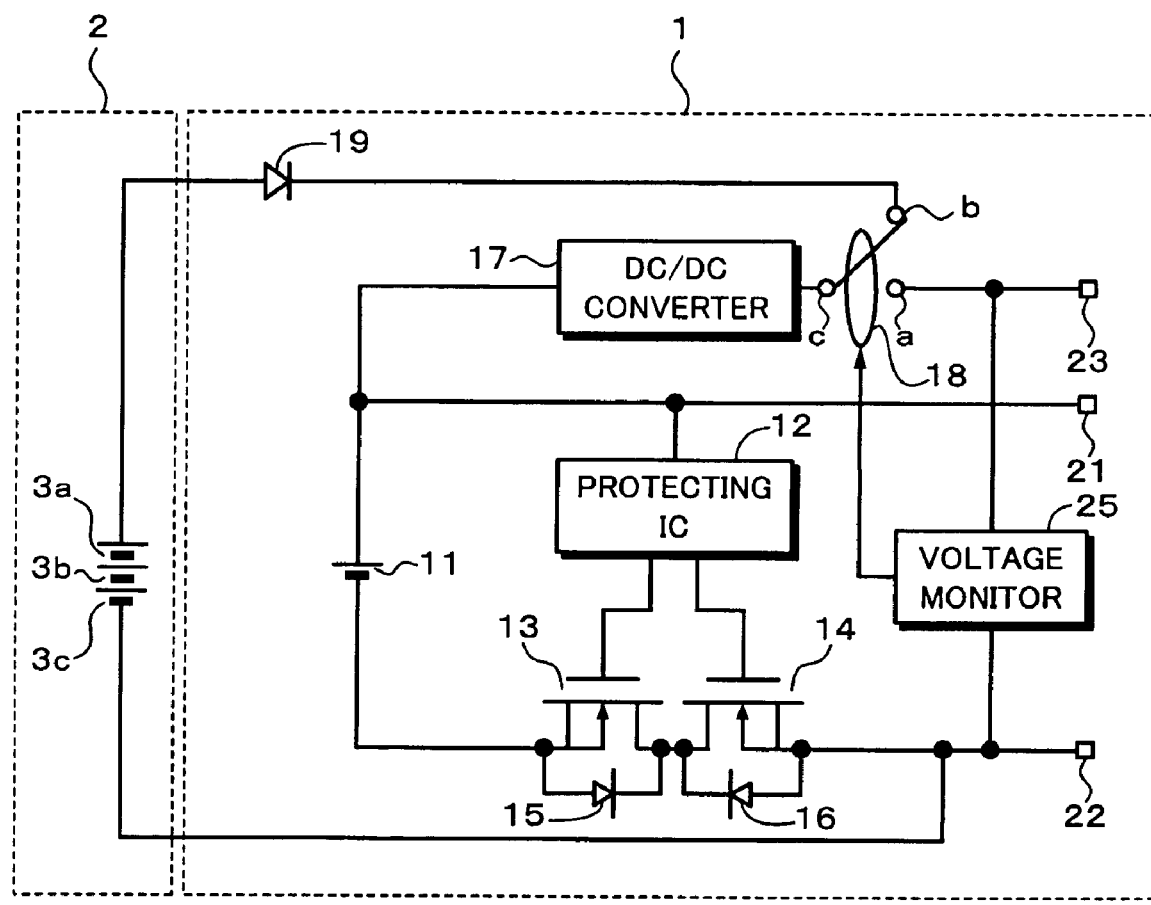
FIG. 5 is a connection diagram of the third embodiment of the invention.

FIG. 5 shows a circuit construction of the third embodiment of the invention. Portions corresponding to those in the construction of FIG. 1 are designated by the same reference numerals. A voltage monitor 25 is provided as control means, the voltage value of the charging terminal 23 is detected by the voltage monitor 25, and the charge change-over switch 18 is controlled in accordance with a detection result.

In the normal state, a detection signal of the voltage monitor 25 is equal to "1" and the charge change-over switch 18 selects the input terminal (b) to which the outputs of the primary batteries 3a to 3c are supplied. When the external charger is attached and the voltage value of the charging terminal 23 detected by the voltage monitor 25 is equal to the set voltage value or more, the detection signal of the voltage monitor 25 is set to "0". The charge change-over switch 18 is automatically switched from the primary battery side (input terminal (b)) to the charger side (input terminal (a)) by this detection signal and the charge by the external charger is started.

Figure 6:
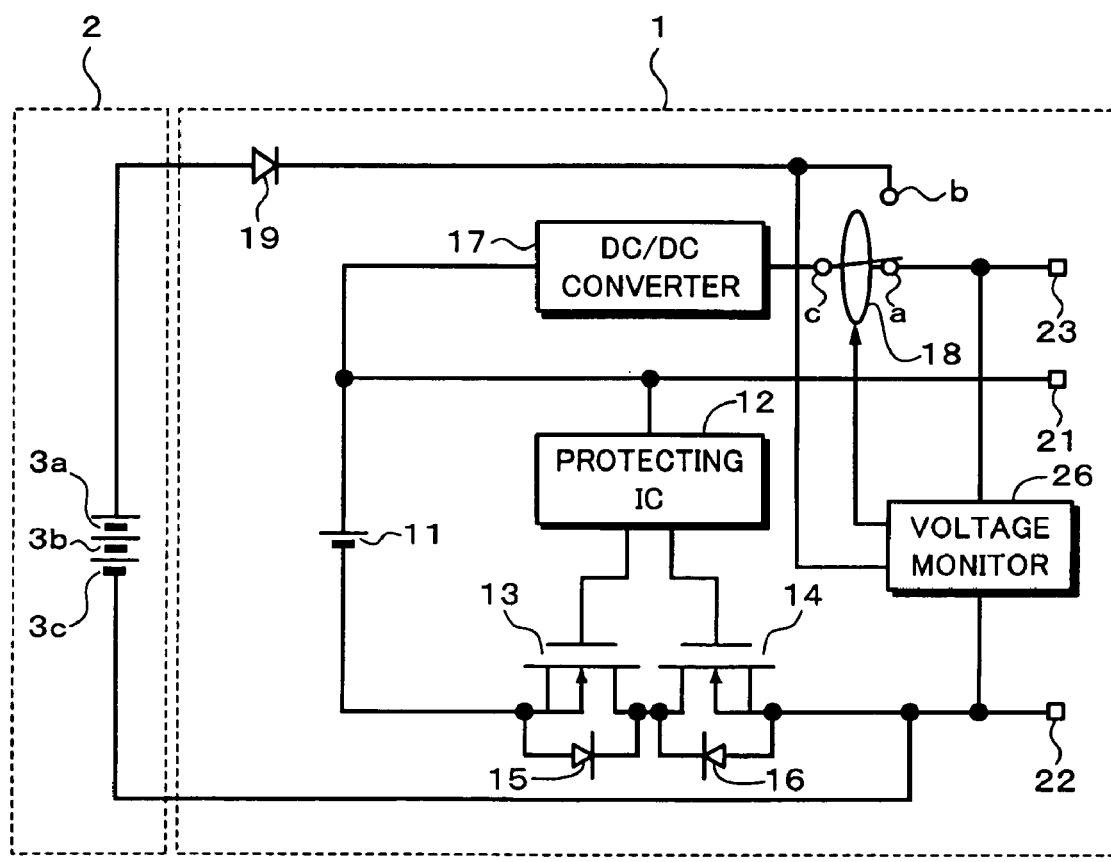
FIG. 6 is a connection diagram of the fourth embodiment of the invention.

FIG. 6 shows a circuit construction of the fourth embodiment of the invention. Portions corresponding to those in the construction of FIG. 1 are designated by the same reference numerals. A voltage monitor 26 is provided as control means. Both of the voltage values of the primary batteries 3a to 3c and the voltage value of the charging terminal 23 are monitored by the voltage monitor 26. The charge change-over switch 18 is controlled so as to select the higher one of the voltages which was detected.

In the normal state where the primary batteries 3a to 3c are not attached and the external charger is not connected, an output detection signal of the voltage monitor 26 is equal to "0" and the charge change-over switch 18 selects the input terminal (a) to which the output of the external charger is supplied. In the state where the primary batteries 3a to 3c are attached and the external charger is not connected, the output detection signal of the voltage monitor 26 is set to "1". The charge change-over switch 18 is automatically switched from the charger side (input terminal (a)) to the primary battery side (input terminal (b)) by this detection signal and the charge from the primary batteries 3a to 3c is started.

Figure 7:
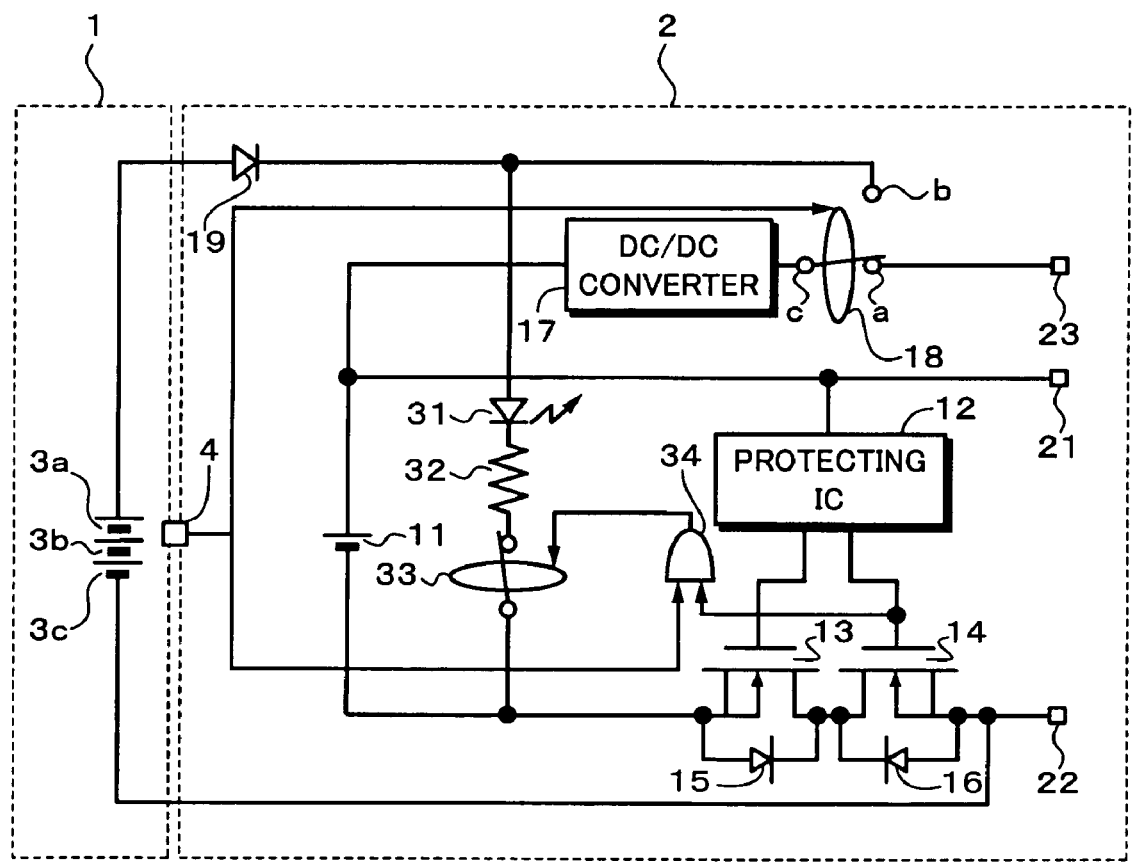
FIG. 7 is a connection diagram of the fifth embodiment of the invention.

FIG. 7 shows a circuit construction of the fifth embodiment of the invention in which an LED 31 that is turned on when the charge is executed by the primary batteries in the first embodiment shown in FIG. 1 is added. An anode of the LED 31 is connected to the cathode of the diode 19. A cathode of the LED 31 is connected to the negative polarity of the secondary battery 11 serially through a resistor 32 and an LED light-on switch 33.

The LED light-on switch 33 is turned on when an output of an AND gate 34 is equal to "1". The detection signal of the detecting switch 4 is inputted to one input terminal of the AND gate 34 and the charge control signal from the protecting circuit 12 is supplied to the other input terminal of the AND gate 34.

As mentioned above, the detection signal of the detecting switch 4 is set to "1" in the state where the primary batteries 3a to 3c are attached, while the charge control signal is set to "1" in the state where the battery is not in the overcharge state. When the primary batteries 3a to 3c are attached, the charge by the primary batteries 3a to 3c is executed by the charge change-over switch 18. Therefore, when the charge by the primary batteries 3a to 3c is executed and the battery is not in the overcharge state, the LED 31 is turned on. When the primary batteries 3a to 3c are discharged, the LED 31 is turned off and this is also true of the following connection examples.

Figure 8:
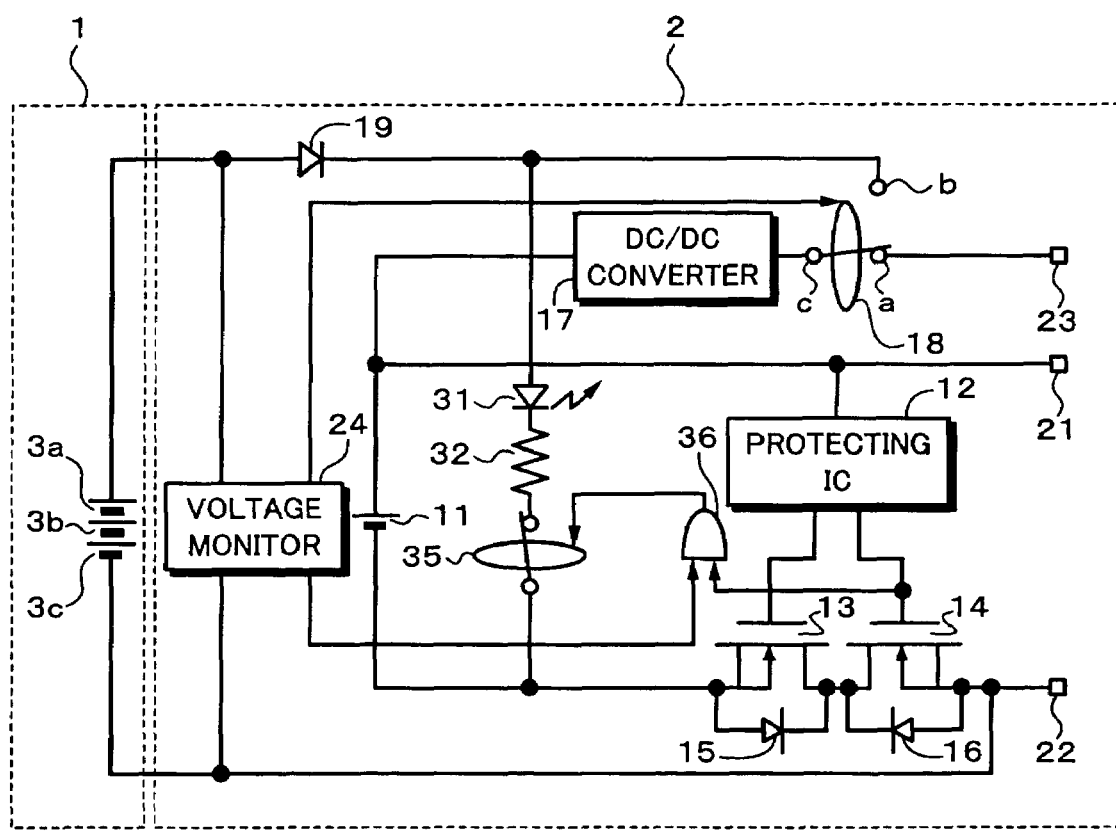
FIG. 8 is a connection diagram of the sixth embodiment of the invention.

FIG. 8 shows a circuit construction of the sixth embodiment of the invention in which the LED 31 that is turned on when the charge is executed by the primary batteries in the second embodiment shown in FIG. 4 is added. A serial circuit comprising the LED 31, the resistor 32, and an LED light-on switch 35 is connected between the cathode of the diode 19 and the negative polarity of the secondary battery 11.

The LED light-on switch 35 is turned on when an output of an AND gate 36 is equal to "1". The detection signal of the voltage monitor 24 is inputted to one input terminal of the AND gate 36 and the charge control signal from the protecting circuit 12 is supplied to the other input terminal of the AND gate 36.

The output detection signal of the voltage monitor 24 to control the charge change-over switch 18 is set to "1" in the case where the primary batteries 3a to 3c are attached and the voltage values of the primary batteries 3a to 3c detected by the voltage monitor 24 are equal to the set voltage value or more. The charge change-over switch 18 is controlled by the output detection signal and the charge by the primary batteries 3a to 3c is executed. The charge control signal is set to "1" when the battery is not in the overcharge state. A detection signal which is supplied to the AND gate 36 is also similar to the detection signal to control the charge change-over switch 18. Therefore, the LED 31 is turned on when the charge by the primary batteries 3a to 3c is executed and the battery is not in the overcharge state.

Figure 9:
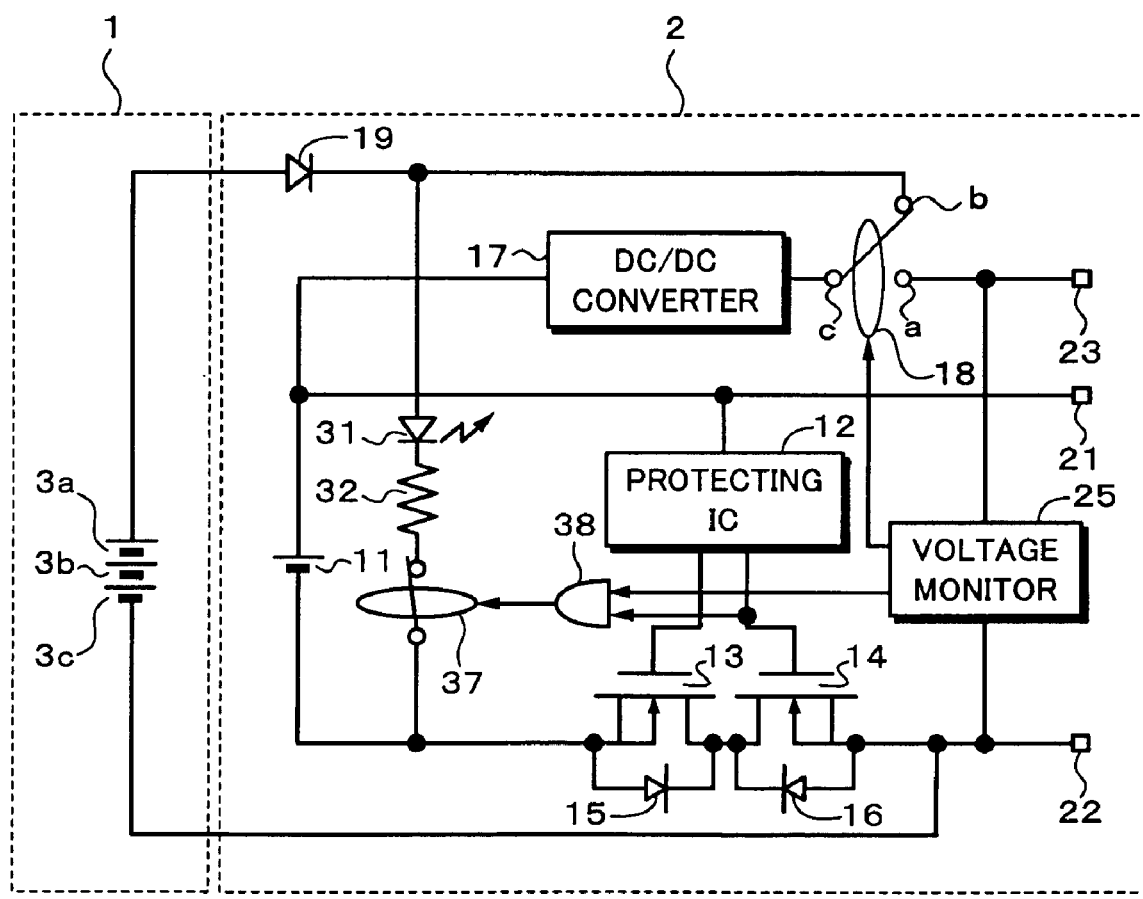
FIG. 9 is a connection diagram of the seventh embodiment of the invention.

FIG. 9 shows a circuit construction of the seventh embodiment of the invention in which the LED 31 that is turned on when the charge is executed by the primary batteries in the third embodiment shown in FIG. 5 is added. A serial circuit comprising the LED 31, the resistor 32, and an LED light-on switch 37 is connected between the cathode of the diode 19 and the negative polarity of the secondary battery 11.

The LED light-on switch 37 is turned on when an output of an AND gate 38 is equal to "1". The detection signal of the voltage monitor 25 is inputted to one input terminal of the AND gate 38 and the charge control signal from the protecting circuit 12 is supplied to the other input terminal of the AND gate 38.

The output detection signal of the voltage monitor 25 to control the charge change-over switch 18 is set to "1" in the case where the external charger is attached and the voltage value of the charging terminal 23 detected by the voltage monitor 25 is equal to the set voltage value or more. The charge change-over switch 18 is automatically switched from the primary battery side (input terminal (b)) to the charger side (input terminal (a)) by this detection signal and the charge by the external charger is started. The charge control signal is set to "1" when the battery is not in the overcharge state. A detection signal which is supplied to the AND gate 38 is also similar to the detection signal to control the charge change-over switch 18. Therefore, the LED 31 is turned on when the primary batteries 3a to 3c are attached in the state where the external charger is not connected and when the battery is not in the overcharge state.

Figure 10:
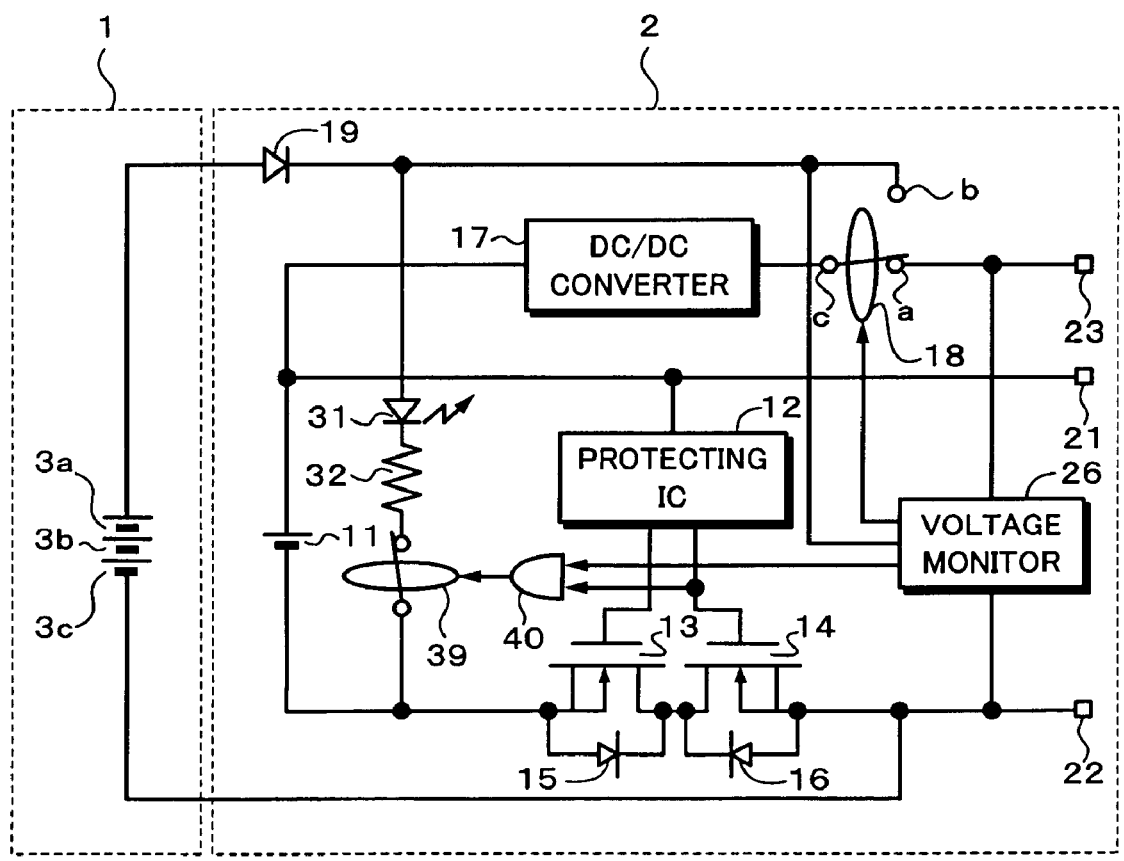
FIG. 10 is a connection diagram of the eighth embodiment of the invention.

FIG. 10 shows a circuit construction of the eighth embodiment in which the LED 31 that is turned on when the charge is executed by the primary batteries in the fourth embodiment shown in FIG. 6 is added. A serial circuit comprising the LED 31, the resistor 32, and an LED light-on switch 39 is connected between the cathode of the diode 19 and the negative polarity of the secondary battery 11.

The LED light-on switch 39 is turned on when an output of an AND gate 40 is equal to "1". The detection signal of the voltage monitor 26 is inputted to one input terminal of the AND gate 40 and the charge control signal from the protecting circuit 12 is supplied to the other input terminal of the AND gate 40.

The output detection signal of the voltage monitor 26 is set to "1" in the state where the primary batteries 3a to 3c are attached and the external charger is not connected. The charge change-over switch 18 is automatically switched from the charger side (input terminal (a)) to the primary battery side (input terminal (b)) by this detection signal and the charge from the primary batteries 3a to 3c is started. A detection signal which is supplied to the AND gate 40 is also similar to the detection signal to control the charge change-over switch 18. Therefore, the LED 31 is turned on when the charge by the primary batteries 3a to 3c is executed and the battery is not in the overcharge state.

The invention is not limited to the foregoing embodiments of the invention or the like but many modifications and variations are possible within the spirit and scope of the present invention. For example, the FET for controlling the discharge and the FET for controlling the charge can be also inserted to the positive polarity of the secondary battery. An arbitrary voltage converter other than the DC/DC converter can be also used. The voltage converter for discharging can be also built in the battery pack. Further, it is also possible to provide such a construction that a charge sequence by the primary battery is controlled in association with the voltage converter. Moreover, the LED can be also turned on while the secondary battery is charged by the charger.

What is claimed is:

1. A battery pack having a secondary battery, comprising:
    a holding unit for detachably holding a primary battery;
    a switch for switching a voltage of said primary battery and a voltage at an external terminal;
    a voltage converter to which either said primary battery voltage or said external terminal voltage selected by said switch is inputted and which supplies a stabilized output voltage to a positive polarity side of said secondary battery;
    a protecting unit that performs overcharge, overdischarge and overcurrent protection;
    a control unit for controlling said switch so as to select said external terminal voltage in a normal state and, when said primary battery is attached, select said primary battery voltage; and
    a light emitting device that is turned on only in the state where said secondary battery is charged by either said primary battery voltage or by said external terminal voltage,
    wherein,
    said control unit is a switch which is provided for said holding unit and detects that said primary battery has been attached, and
    a light emitting device light-on switch is turned on when an output terminal of an AND gate is equal to "1" and a detection signal of said detecting switch is inputted to one input terminal of the AND gate and a charge control signal from said protecting circuit is supplied to the other input terminal of the AND gate.

2. A pack according to claim 1, wherein when an input voltage is lower than a set voltage value, said voltage converter increases the voltage and, when said input voltage is higher than said set voltage value, said voltage converter decreases the voltage.

3. A pack according to claim 1, wherein said voltage converter is a DC/DC converter.

4. A pack according to claim 1, wherein said control means is a monitor for detecting that a value of said primary battery voltage is larger than a set value.

5. A pack according to claim 1, wherein said control means is a monitor for detecting that a value of said external terminal voltage is larger than a set value.

6. A pack according to claim 1, wherein said control means is a monitor for comparing a level of said primary battery voltage with that of said external terminal voltage and detecting the voltage of the higher level.

* * * * *